United States Patent
Kosarev

(10) Patent No.: US 8,433,121 B2
(45) Date of Patent: Apr. 30, 2013

(54) METHOD FOR BRIGHTNESS LEVEL CALCULATION IN THE AREA OF INTEREST OF THE DIGITAL X-RAY IMAGE FOR MEDICAL APPLICATIONS

(75) Inventor: Ruslan Nikolaevich Kosarev, Lahnau (RU)

(73) Assignee: Zakrytoe akcionernoe obshchestvo "Impul's", Sankt-Petersburg (RU)

( * ) Notice: Subject to any disclaimer, the term of this patent is extended or adjusted under 35 U.S.C. 154(b) by 22 days.

(21) Appl. No.: 13/239,824

(22) Filed: Sep. 22, 2011

(65) Prior Publication Data

US 2012/0014586 A1 Jan. 19, 2012

Related U.S. Application Data

(63) Continuation of application No. PCT/RU2010/000611, filed on Oct. 21, 2010.

(30) Foreign Application Priority Data

Mar. 31, 2010 (RU) ................................. 2010112306

(51) Int. Cl.
*G06K 9/00* (2006.01)
*B41M 5/00* (2006.01)

(52) U.S. Cl.
USPC .............................. 382/132; 382/274; 378/28

(58) Field of Classification Search .................. 382/100, 382/103, 106, 107, 128–134, 155, 162, 164, 382/149, 168, 173, 181, 209, 224, 232, 254, 382/274, 276, 305, 312; 705/2; 378/4, 21, 378/23, 28
See application file for complete search history.

(56) References Cited

U.S. PATENT DOCUMENTS

| | | | | |
|---|---|---|---|---|
| 6,269,179 | B1 * | 7/2001 | Vachtsevanos et al. | 382/149 |
| 7,218,763 | B2 * | 5/2007 | Belykh et al. | 382/128 |
| 7,747,058 | B2 * | 6/2010 | Spahn | 382/132 |
| 8,027,849 | B2 * | 9/2011 | Johnson et al. | 705/2 |
| 8,311,850 | B2 * | 11/2012 | Johnson et al. | 705/2 |

(Continued)

FOREIGN PATENT DOCUMENTS

| | | |
|---|---|---|
| EP | 0409206 B1 | 10/1997 |
| WO | 00/60908 A1 | 10/2000 |

OTHER PUBLICATIONS

International Search Report from PCT/RU2010/000611 filed Oct. 21, 2010, mailed Mar. 2, 2011.

(Continued)

*Primary Examiner* — Sayed Azarian
(74) *Attorney, Agent, or Firm* — Patentbar International, P.C.

(57) ABSTRACT

The invention relates to methods for evaluation a level of brightness in the area of interest of the digital x-ray image for medical applications by means of the image histogram using a neural network. The calculations comprise of: image acquisition, image histogram calculation, converting histogram values into input arguments of the neural network and output values of the neural network acquiring. As input arguments of the neural network the histogram values calculated with the given bin width and normalized to unity are used. The level of brightness is calculated as a linear function of the output value of the neural network. Neural network learning is performed using a learning set calculated on the base of the given image database; as a set of target values the levels of brightness calculated for each image over the area of interest and scaled to the range of the activation function of a neuron in the output layer of the neural network are used.

5 Claims, 3 Drawing Sheets

U.S. PATENT DOCUMENTS

2006/0198552 A1  9/2006  Spahn
2007/0076937 A1  4/2007  Spahn

OTHER PUBLICATIONS

Chang C-C et al.: "A Connectionist Approach for Thresholding", proceedings, 11th IAPR International Conference on Pattern Recognition, 1992.

Haykin, S.: "Neural networks: A comprehensive foundation" / Simon Haykin—2nd ed.—Delhi: Pearson Prentice Hall, 1999—842 p.

Gonzalez, R.C. et al.: "Digital Image Processing Using MATLAB" / Rafael C. Gonzalez, Richard E. Woods, Steven L. Eddins—New Jersey: Pearson Prentice Hall, 2004.

* cited by examiner

METHOD FOR BRIGHTNESS LEVEL CALCULATION IN THE AREA OF INTEREST OF THE DIGITAL X-RAY IMAGE FOR MEDICAL APPLICATIONS

CROSS-REFERENCE TO RELATED APPLICATIONS

This application is a Continuation application of International Application PCT/RU2010/000611 filed on Oct. 21, 2010, which in turn claims priority to Russian application No. RU2010112306 filed on Mar. 31, 2010, both of which are incorporated herein by reference in their entirety.

FIELD OF THE INVENTION

This invention relates to processing methods of digital x-ray images for medical applications, namely, to the brightness level calculation in the area of interest of the digital x-ray image for medical applications.

BACKGROUND OF THE INVENTION

An x-ray image besides images of patient organs projections generally involves images of parts of a device (e.g. collimator) and air projections. An area of interest is usually meant as that part of an image where there is the image of patient organs projections only. The necessity to determine the brightness level correctly occurs for example in the following cases:
1) At digital image visualization on a display of the monitor
2) For exposure control during the acquisition of series of x-ray images.

The x-ray image visualization with the correct brightness and contrast levels contributes to better understanding the x-ray image and right diagnosing respectively. While acquiring series of sequential images knowing the level of brightness in the area of interest in the previous image the digital detector exposure time can be correctly set to acquire the next image. Correctly chosen exposure allows acquiring x-ray images of considerable higher quality without dark and/or overexposed areas with optimal noise-to-signal relationship in the area of interest. The standard exposure frequency of the x-ray image series is 30 frames per second, therefore it is extremely important to determine the brightness level fast enough to be able to adjust the exposure time and/or x-ray tube characteristics. It is also necessary that the brightness level calculation method be stable in course of calculations performed on series of sequential images.

The method [R. Gonzalez, R. Woods, S. Eddins. Digital Image Processing Using MATLAB (DIPUM). Technosphera, 2006, p. 32] for image brightness level determination is known. According to that method the level of brightness is calculated as a mean value between the minimum and maximum brightness values $$Level = (Value_\alpha + Value_{1-\alpha})/2$$

$Value_\alpha$ is a quantile level $\alpha$ for brightness of each pixel over the image. Parameter $\alpha$ is to be chosen sufficiently small, not more than 0.01. This method does not provide necessary calculation accuracy of the level of brightness in case of presence of air and/or collimator areas within the image.

The closest technical solution chosen as a prototype is the method for determination of the brightness level described in [Patent EP 0 409 206 B1, p. 6, published Jan. 10, 1997,]. In accordance with the prototype the method comprises of reading out the digital image data into the main memory of the device and performing after that the following calculations:
1) The image histogram with the bin width equal to 1 is calculated.
2) The level A of brightness at which pixels of lower brightness considered the background once is calculated.
3) The histogram within the interval where pixel brightness is more than A is analyzed. The brightness MVP correlating with the maximum histogram value in the said interval is calculated.
4) Initial values for image visualization is chosen: window level $WL_0$=MVP and the window width $WW_0$=2×(MVP−A).
5) The parameter $\Delta WW=WW_0/2$ is calculated.
6) Using a neural net the quality index $\{Q_i\}_{i=0}^8$ is calculated for each pair of values ($WL_0 \pm \Delta WW$, $WW_0 \pm \Delta WW$).
7) Using the hill climbing method, such a pair of values ($WL_c$, $WW_c$) at which the quality index $Q_c$ has its maximum value is calculated. During an iterative procedure the parameter $\Delta WW$ is corrected.

The quality index is evaluated by means of an artificial feedforward neural network, (hereinafter—neural network), having one hidden layer and one neural in the output layer with the sigmoid activation functions of neurons. The window level and window width ($WL_c$, $WW_c$), correlating to the maximum value of the quality index $Q_c$, is considered optimal parameters for image visualization.

One or several images for which a skilled operator sets desirable values of the window level and window width (WLG, WWG) are used for training. Then a table consisting out of 25 values is made.

$$(WLG \pm \Delta WWG/2 \pm \Delta WWG/4, WWG \pm \Delta WWG/2 \pm \Delta WWG/4) \leftrightarrow Q_i,$$

$$\Delta WWG = WWG/2;$$

$Q_i$—predetermined values of the quality index.
Neural network input arguments (five or even more) are calculated for each pair ($WL_i$, $WW_i$). The quality index $Q_i$, correlating to the appropriate pair ($WL_i$, $WW_i$), is used as a target value. So, marking desirable parameters of the window level and window width on the given image set an operator gets data for neural network training and after that trains it.

Disadvantages of the method according to the prototype are as follows:
1) Being applied to exposure control task when brightness level is only to be determined the method provides redundant information.
2) By means of the method the algorithm stability in course of calculation of series of imagers is not controlled. It is important for exposure control during the acquisition of series of imagers.

SUMMARY OF THE INVENTION

The technical result tends to determine a brightness level correlating to a mean brightness value in the area of interest of an x-ray image for medical applications.

The technical result of the invention under application consists of the determination of the level of brightness in the area of interest of an x-ray image for medical applications. At that, the method is stable in course of calculation of series of imagers. The supplementary technical result involves simplicity of the hardware and high performance algorithm.

The technical result of the invention consisting of the acquisition of the image, calculation of the image histogram, transformation of the histogram values into input arguments of the neural network, and calculation of the level of brightness by means of the artificial neural network is achieved, due to the fact, that the values of the histogram are calculated with the given bin width, normalized to unity and used as the input arguments of the neural network, the level of brightness is calculated as a linear function of the output value of the neural network and neural network training is performed using a learning set determined on the base of the given images, the levels of brightness calculated for each image in the area of interest and scaled to the range of activation function of a neural of the output level of the neural network are used as a set of target values.

As a neural network an artificial feedforward neural network having one hidden layer and one neuron in the output layer with the sigmoid activation functions of neurons is used.

The bin width for calculating histogram values is assumed to be equal to the relationship between quantile of pixel brightness distribution over the image and number of input arguments of the neural network.

The level of brightness in the area of interest is calculated as a mean value of pixel brightness within the area of interest.

The values of histogram are calculated over all image pixels.

The values of histogram are calculated on pixels within the circle, the center of which coincides with the image centre and its diameter is equal to the shortest side of the image.

The algorithm is based on the experimentally established fact that there is a statistical relationship between the image histogram and the level of brightness in the area of interest.

The aspect of the method under application is as follows.

As input arguments of the neural network the normalized to unity image histogram values calculated with the given bin width are used.

1) The level of brightness is calculated as a linear function of the output value of the neural network.
2) Neural network training is performed using a learning set specified on the base of the given images, the levels of brightness calculated for each image in the area of interest and scaled to the range of activation function of a neural of the output level of the neural network are used as a set of target values.

In order to identify a statistical relationship between the histogram and the level of brightness an artificial feedforward neural network is used [Simon Haykin. Neural networks a Comprehensive Foundation., 2006, p. 55]. Now we are going to identify some general stages of method realization:
1) Database generation and classification out of medical x-ray images.
2) Design of learning set examples—a set of input arguments of the neural network and a set of target values.
3) Selection of the error function and neural network training algorithm.
4) Training the set of neural network of different architecture, different input number, layers and neurons.
5) Selection of the neural network with the least number of parameters, in the best way suited to solve the problem.

The method essence is explained by means of the figures given below.

Error=100×(Level'/Level−1),

Level'—level of brightness acquired using the method under application;
Level—level of brightness calculated over the area of interest.

Figure 1:
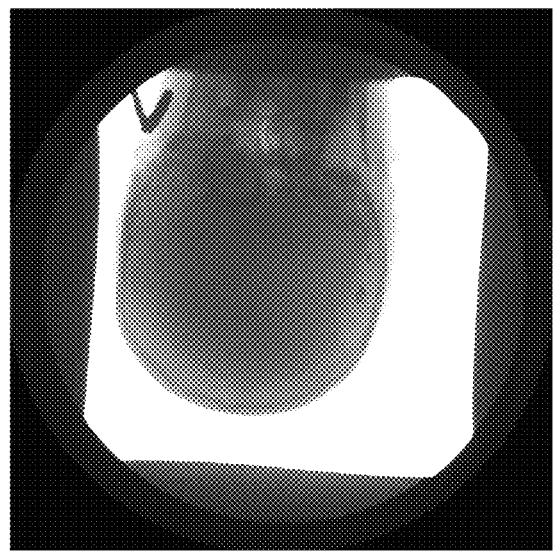
FIG. 1 Example of the digital x-ray image for medical applications acquired from one of the x-ray apparatuses.
Figure 2:
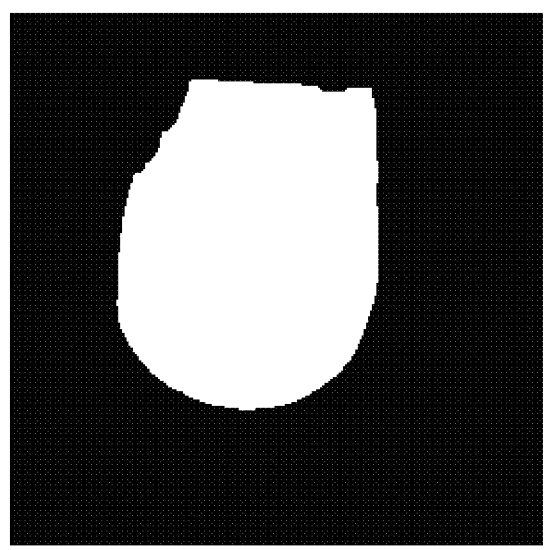
FIG. 2 Area of interest correlating to the image of FIG. 1.
Figure 3:
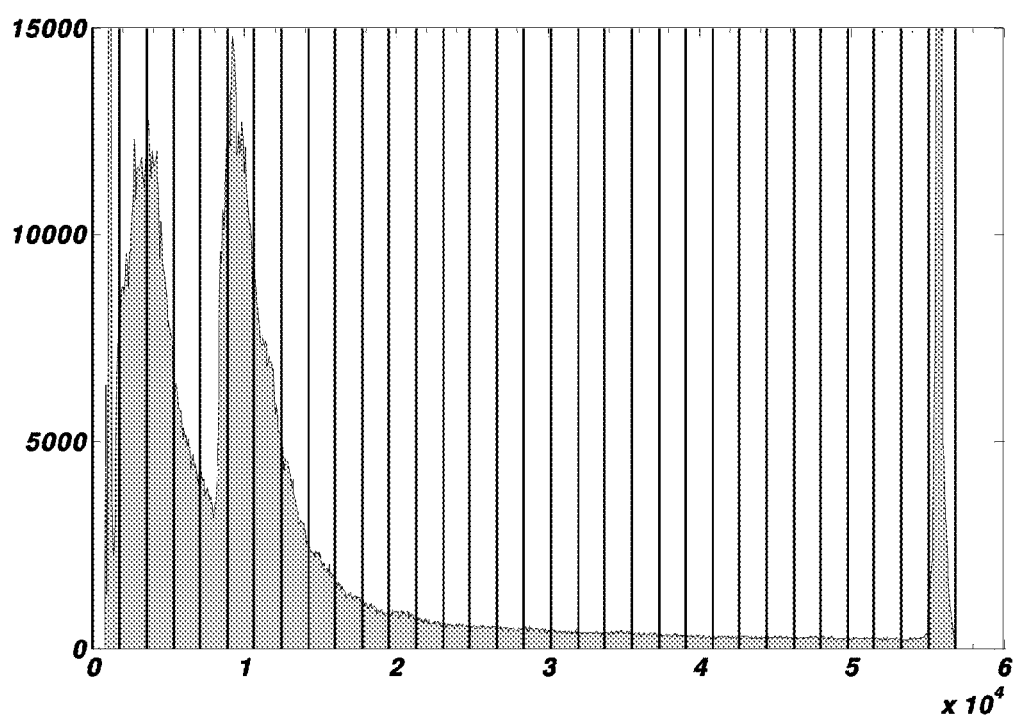
FIG. 3 Example of the histogram of 16 bit image. Gray scale is in horizontal direction, pixel number with the given brightness—in vertical direction. Vertical lines show interval subdividing [0, Bright] into 32 parts. The value Bright is defined as quantile of image brightness having the level $\alpha=0.999$.
Figure 4:
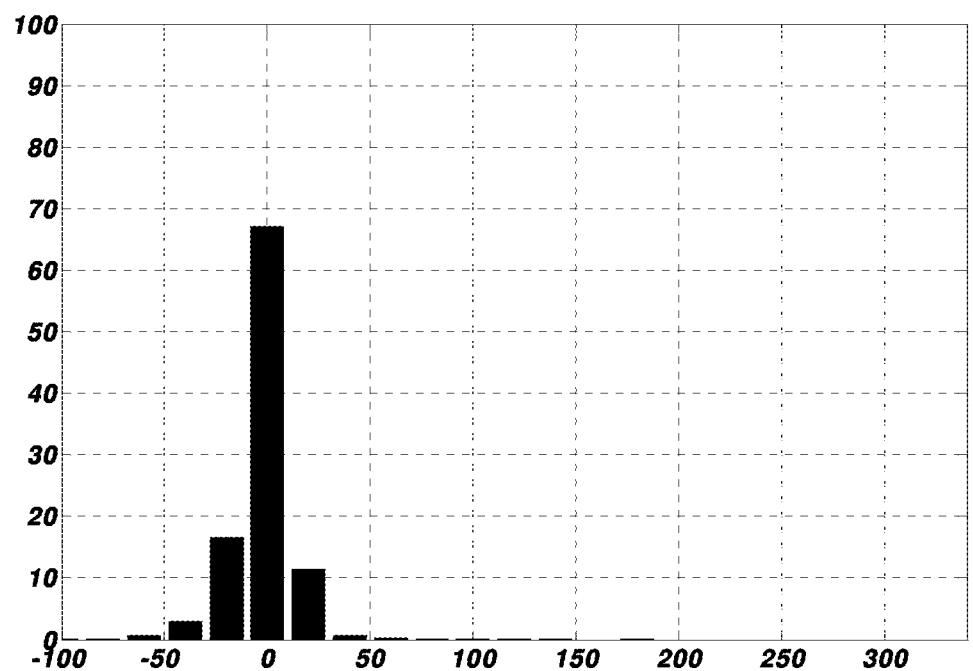
FIG. 4 Common histogram of a relative error for a learning sample
Figure 5:
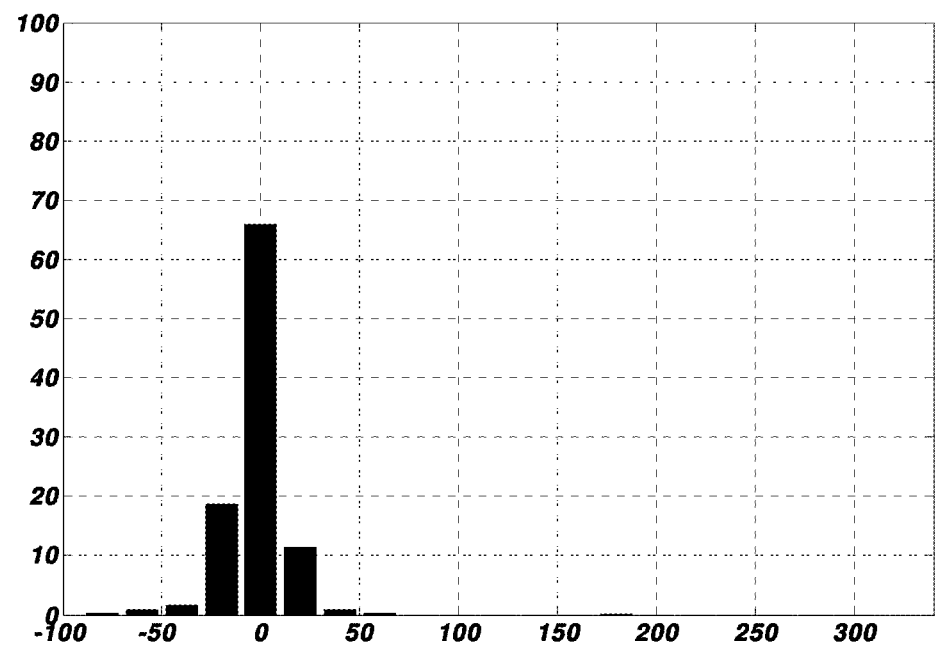

FIG. 5 Common histogram of a relative error for a test sample.

Stage 1. Image database generation involves image classification on organ types and generating a binary image having an area of interest for every image. Generating a binary image having an area of interest can be performed using a specialized software or manually marking the area of interest in the image by means of any standard image processor. At the first stage a database is generated which consists of pair set {Image, Roi}, where Image is the initial image and Roi—the image of the appropriate area of interest. In our case there was collected and processed about ten thousand of images.

Stage 2. involves design of learning set examples. For each pair {Image, Roi} the histogram of the image Hist is calculated, bin width is equal to unity, the level of brightness in the area of interest is Level. As a level of brightness an average pixel brightness value over all pixels within the area of interest $$\text{Level} = \frac{1}{M} \sum_{k \in Roi} p_k$$

Level—level of brightness in the area of interest;
$p_k$—k-pixel brightness value;
M—number of pixels in the area of interest.

As a result for each pair {Image, Roi} a pair consisting of histogram and level of brightness {Hist, Level} is acquired.

The histogram can be evaluated over the whole image as well as over the preliminary selected area. Usually, a patient under exposure is positioned in such a way that the image projection of organs under exposure be in the center of the digital matrix. Therefore in the second variant of histogram evaluation a circle can be considered such an area where the center aligns with the center of the image and diameter, for instance, is equal to the shortest side of the image.

Now for each pair {Hist, Level} some input arguments Input and a target value Target shall be evaluated. Input arguments Input and target value Target denoting a set of learning parameters, shall meet the following requirements:
1) Pairs {Input, Target} shall be invariant relatively to multiplication of the image by a constant value and not to be dependent on the image size (with allowance for pixel brightness discreteness).
2) Target values Target must belong to the range of activation functions of neuron of the output layer.

Then it is necessary to provide the invariance of pairs {Input, Target} relatively to multiplication of the image by a constant value. For histogram Hist the brightness interval [0, Bright] is calculated in such a way that upper limit Bright be a quantile level $\alpha$ of the image pixel brightness. Then, the interval [0, Bright] shall be divided by S—equal intervals and Input, value is estimated as a sum of histogram $\text{Hist}_k$ values within the interval I, $$\text{Input}_i = \sum_{k \in I} \text{Hist}_k$$

$\text{Input}_i$—input argument with the index i;
$\text{Hist}_k$—value of the histogram Hist with the index k.
As a result the value of $\text{Input}_i$ is normalized to unity $$\text{Input}_i = \frac{\text{Input}_i}{\sum_k \text{Input}_k}$$

S is a number of inputs of the neural network, it is selected by means of numerical experiments together with parameter α. Input arguments Input are the normalized to unity histogram values calculated with the bin width Bright/S. Further, Target'=Level/Bright is calculated for each Level. In such a way obtained pairs {Input, Target'} are invariant relatively to multiplication of the image by a constant value and not to be dependent on the image size.

Sigmoid function is used to generate a set of target values used for activation functions of neurons $$f(x) = \frac{1}{1 + \exp(-x)},$$

The range of which is the interval [0,1], that is way a set of target values Target is to be normalized to this interval. For this purpose the linear transformation is used:

$$\text{Target} = \frac{\text{Target}' - \min\{\text{Target}'\}}{\max\{\text{Target}'\} - \min\{\text{Target}'\}}$$

Below can be seen a formula to calculate the level Level on the base of the output value Output of the neural network:

Level=Bright×($C_1$×Output+$C_2$)

$C_1$=max{Target'}−min{Target'};

$C_2$=min{Target'}

The level of brightness is calculated as a linear function of the output value of the neural network.

As an error function of the neural network serve two variants. The first variant is a mean-root-square error having regularity $$\text{Error} = \text{Ratio} \times \frac{1}{N} \sum_{i=1}^{N} (\text{Output}_i - \text{Target}_i)^2 + (1 - \text{Ratio}) \times \sum_k x_k^2$$

The second variant is a mean-root-square error having regularity $$\text{Error} = \text{Ratio} \times \sum_{i=1}^{N} W_i(\text{Output}_i - \text{Target}_i)^2 + (1 - \text{Ratio}) \times \sum_k x_k^2$$

Ratio—regularity parameter;
$W_i$—weight corresponding to the learning pair {Input, Target} having index i;
N—number of learning pairs taking part in the error evaluation;

$\sum_k x_k^2$ – sum of squares of all neural net parameters.

The first summand in both formulas defines the accuracy of neural net learning, and the second one—regularizing multiplier—provides neural net steadiness. Weights $W_i$ are calculated using the formula $$W_i = \frac{1}{\text{Target}_i'^2} \Big/ \sum_{i=1}^{N} \frac{1}{\text{Target}_i'^2}$$

e.g. pairs with big value $\text{Target}'_i$ corresponds to smaller weight $W_i$.

For neural net learning a standard algorithm—conjugate gradient method with back-propagation—is used [Moller, Neural Networks, vol. 6, 1993, p. 525]. Regularizing multiplier Ratio is selected in such a way as to eliminate maverick more than 0.5 percent while multiple calculating the level Level at image rotation. In our case this parameter turned to be equal to Ratio=0.9999.

In order to avoid overexposure it is used a standard approach in course of which a range of learning examples {Input, Target} is divided into two parts. One of them is used for neural net learning, and the second one—for testing. After image database generation they perform classification of medical x-ray images on the base of the organ type. Then the range of learning examples is divided into two samples in relationship 80 and 20 percent in such a way as to place 80 percent of images of each group into a learning sample, and remaining 20 percents—into a sample for testing.

Numeral experiments showed that for the solution of the given task there turned to be possible to use a feedforward neural network, having one hidden layer, 30 to 60 inputs and 5-10 neurons in the hidden layer. Parameter α can be chosen from the interval 0.98 to 0.9999. In order to realize the method under application in a specified device there was chosen a neural network having minimum number of parameters, other conditions being equal.

DETAILED DESCRIPTION OF THE PREFERRED EMBODIMENTS

The preferable variant of the invention implementation is the method to evaluate the brightness level in the area of interest of the digital x-ray image for medical applications that involves an image acquisition, image histogram calculation, converting histogram values into input arguments of the neural network and the brightness level calculation using artificial neural network.

The histogram values are calculated with the given bin width then normalized to unity and used as input arguments of the neural network. The level of brightness is calculated as a linear function of the output value of the neural network.

Neural network learning is performed using a learning set calculated on the base of the given image database; as a set of target values the levels of brightness calculated for each image over the area of interest and scaled to the range of the activation function of a neuron in the output layer of the neural network are used.

As a neural network an artificial feedforward neural network having one hidden layer and one neuron in the output layer with the sigmoid activation functions of neurons is used.

The bin width for calculating histogram values is assumed to be equal to the relationship between quantile of pixel brightness distribution having the level close to unity and number of input arguments of the neural network.

The level of brightness in the area of interest is calculated as a mean value of pixel brightness within the area of interest.

The values of histogram are calculated on pixels within the circle, the center of which coincides with the image centre and its diameter is equal to the shortest side of the image.

Industrial Applicability

Known numerical methods of data processing and analyzing are used in the method under application. Also known hardware and devices are used to acquire said data.

What is claimed is:

1. A method for determining brightness in a region of interest of a medical digital X-ray image comprising:
   acquiring the image;
   calculating a histogram of the image;
   converting the histogram values into input arguments for a neural network; and
   calculating the brightness using the neural network,
   the neural network being an artificial feedforward neural network having one hidden layer and an output layer consisting of one neuron and having sigmoid neurons' activation functions;
   wherein the histogram values are calculated using a bin width;
   further comprising normalizing the histogram values to unity before using the histogram values as input arguments for the neural network;
   wherein the brightness is calculated as a linear function of an output value of the neural network;
   further comprising neural network learning using a training set calculated using an image database;
   further comprising using, as a set of target values, a plurality of brightness values calculated for a region of interest of each image and scaled to a range of a neuron activation function on an output layer of the neural network.

2. The method of claim 1, wherein the class interval is a ratio of a quantile of pixel brightness distribution with near-unity brightness and a number of input arguments for the neural network.

3. The method of claim 1, wherein brightness for a region of interest is a mean value of pixel brightness within the region of interest.

4. The method of claim 1, wherein the histogram values are calculated for all pixels of the image.

5. The method of claim 1, wherein the histogram values are calculated for pixels within a circle centered at an image center, and wherein the circle's diameter is a smallest image dimension.

* * * * *